Dec. 8, 1931.                A. L. WEBRE                1,835,620
                              VACUUM PAN
                   Filed May 28, 1930    2 Sheets-Sheet 1

WITNESS:

INVENTOR
Alfred L. Webre
BY
ATTORNEY.

Dec. 8, 1931.   A. L. WEBRE   1,835,620
VACUUM PAN
Filed May 28, 1930   2 Sheets-Sheet 2

WITNESS:
Robt P Kitchel

INVENTOR
Alfred L. Webre
BY Francis T Chambers
ATTORNEY.

Patented Dec. 8, 1931

1,835,620

UNITED STATES PATENT OFFICE

ALFRED L. WEBRE, OF MERION, PENNSYLVANIA, ASSIGNOR TO UNITED STATES PIPE & FOUNDRY COMPANY, OF BURLINGTON, NEW JERSEY, A CORPORATION OF NEW JERSEY

VACUUM PAN

Application filed May 28, 1930. Serial No. 456,392.

My invention relates to vacuum pans of the type commonly used in sugar factories and has for its object to provide better circulation of the fluid contents of the pan. In apparatus of this kind a steam belt is located in the shell of the pan and is provided with a relatively large central opening for the down flow of the liquid contents of the pan and with a multiplicity of tubes extending through the steam belt for the up flow of the liquid contents. The object of my invention is to provide for a more energetic circulation of the fluid contents of the pan through this steam belt with consequent increased transmission of heat from the tubes of the steam belt to the liquid mass and increased efficiency of operation. A further object of my invention is to provide means for causing the upper strata of the liquid mass contained in the pan to circulate freely through the steam belt. With the above objects in view the leading features of my invention consist in forming the steam belt so that it will extend from the walls of the vacuum pan without leaving any openings between it and the walls of the pan; locating in the central opening of the steam belt a screw pump which will draw the liquid mass downward and force it upward through the multitudinous tubes provided in the steam belt in the space between the central opening and the walls of the pan. By this construction I secure a positive and regulable speed of passage of the liquid mass through the tubes of the steam belt. A further feature of my invention consists in providing below the screw pump a system of vanes so shaped and located as to counteract the swirling tendency imparted to the liquid by the pump. Still another feature of my invention consists in providing in the upper part of the vacuum pan a rotary impeller or conveyor which will engage the upper strata of the liquid in the pan and force it down toward the central opening in the steam belt, thus insuring that the entire liquid contents of the pan shall be maintained in constant circulation through the steam belt.

Figure 1:
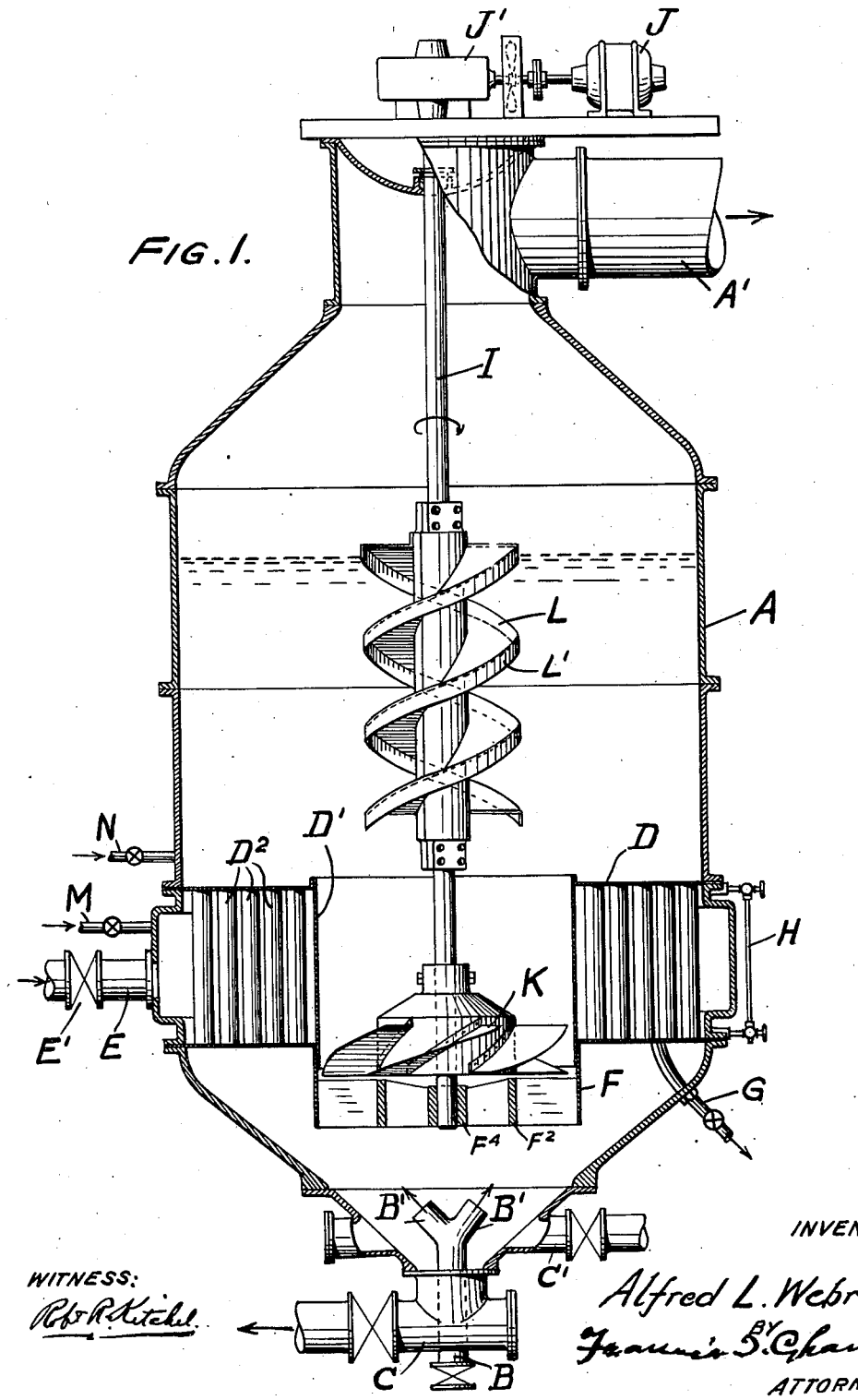

My improvements will be best understood as described in connection with the drawings, which illustrate a vacuum pan provided with my improvements and in which Figure 1 is a vertical sectional elevation through the vacuum pan and the operative parts contained therein.

Figure 2:
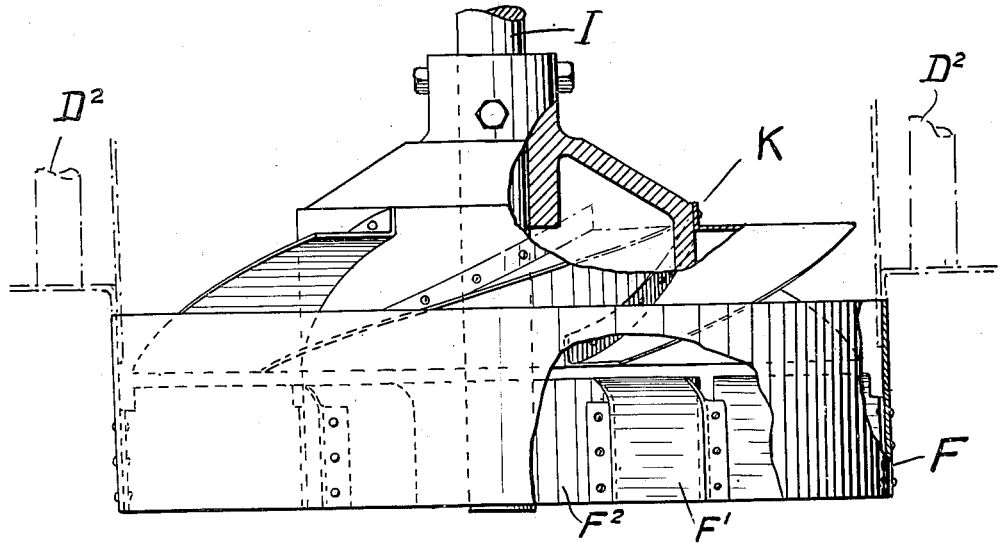
Figure 3:
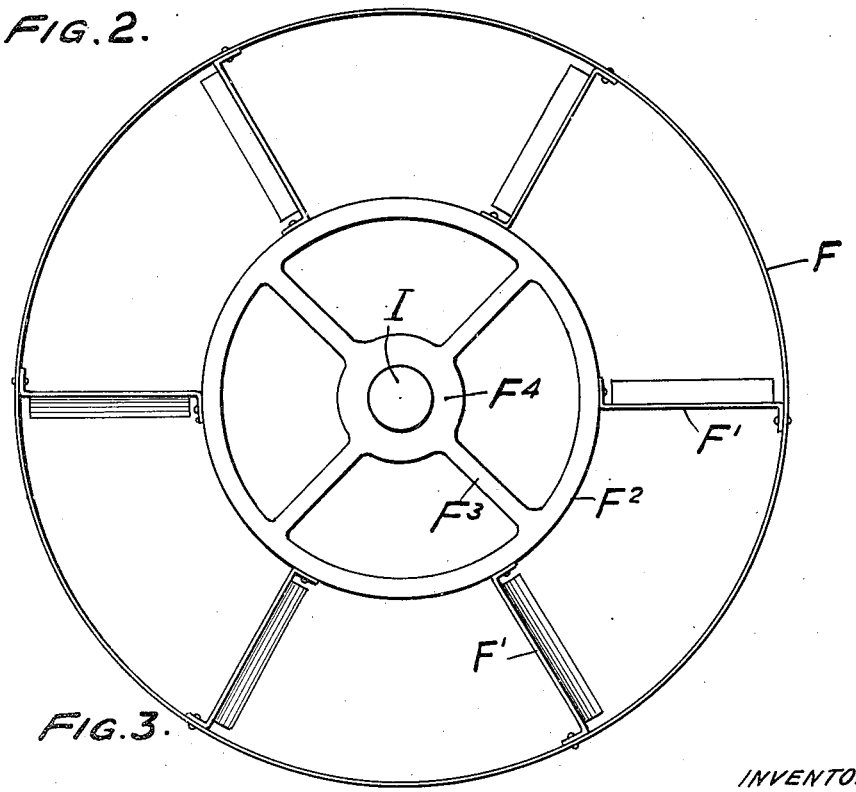

Figure 2 is a view illustrating the pump and the extension of the cylinder forming the walls of the central opening in the steam belt partly broken away to show the vane system for counteracting the swirling action imparted to the liquid by the pump, and Figure 3 is an inverted plan view of the parts shown in Fig. 2 with the pump removed.

A is the shell of the vacuum pan having a conduit $A^1$ at its top leading to a condenser, not shown.

B is a conduit through which syrup or molasses can be introduced into the vacuum pan. As shown this is supplied with two delivery nozzles $B^1 B^1$. The material resulting from the treatment of the syrup or molasses in the vacuum pan, generally known as massecuite, can be drawn off through a conduit indicated at C and as shown another conduit $C^1$ is also provided for this purpose. D is a vertical steam chamber extending inward from the walls of the shell or casing having a large central opening $D^1$ and a multiplicity of relatively small tubes extending through it in the annulus surrounding the central opening as indicated at $D^2$. This steam chamber is supplied with steam or vapor through a conduit indicated at E, having as shown a valve $E^1$ by which the steam or vapor supply can be cut off. The cylinder forming the wall of the central opening is preferably extended below the horizontal steam chamber, as indicated at F. G is a pipe through which water can be drawn from the steam chamber and H is a water glass by which the level of water in the steam chamber is made visible. $F^1 F^1$, etc. indicate vanes secured to the walls of the extension F, which are so shaped as to counteract the swirling action which would be given to the liquid propelled by the pump, to be described. These vanes also support a ring $F^2$ which in turn supports a spider $F^3$ which forms a guide bearing $F^4$ for the lower end of the propeller shaft of the pump. I is a shaft in the top of the vacuum pan shell and driven by a motor J through a reduction gearing indicated at J¹. On the lower end of this shaft is secured a screw pump, indicated at K, and to the upper portion of shaft is secured a rotary conveying device of such a character that it will act on the upper portion of the contents of the vacuum pan and tend to carry it downward in the direction of the large central opening in the steam belt. As shown, the device provided for this purpose is a screw indicated at L having a downwardly extending flange L¹ on its outer edge. M indicates a pipe for supplying water to the steam belt which is desirable for certain purposes and not involved in the subject matter of my present invention, and N is also a water supply pipe entering the vacuum pan, which is provided for the purpose of supplying water for washing the lower portion of the pan and its contents, as is sometimes desirable.

In operation the vacuum pan is charged with the syrup or other materials ordinarily treated in such apparatus; steam or vapor at proper temperature is turned into the steam belt and the condenser operatively connected with the top of the pan. The shaft I is set in operation, rotating the pump K and a conveyor L. It will of course be obvious that the liquid in the pan is engaged and propelled downward towards the central opening in the steam belt D¹ by the action of the conveyor L and is energetically drawn and forced through the central opening D¹ by the action of the pump K. The swirl imparted to the liquid by the pump is counteracted by the vanes F¹ and the liquid is forced upward through the tubes D² of the steam belt with a regulable and known velocity so that the heating effect communicated to the liquid contents of the pump can be nicely regulated.

Rapid motion of the massecuite in passing through the tubes of the steam belt while insuring a high rate of heat transfer also insures that the massecuite shall not stop in contact with the heated surfaces for a sufficient length of time to bring about a burning of the sugar and the operation of the apparatus as a whole insures the maintenance of a substantially uniform temperature throughout the body of syrup or massecuite.

Having now described my invention, what I claim as new and desire to secure by Letters Patent, is:

A vacuum pan having a horizontal steam chamber extending inward from its walls dividing the body of the pan into upper and lower chambers, said steam chamber having a central passage of large diameter formed through it for the down flow of liquid and a multiplicity of tubes of relatively small diameter extending through it for the up flow of liquid and a screw pump located in the central passage acting to effect a forced downward flow therein and an upward flow of liquid through the tubes traversing the steam chamber of relatively high velocity, in combination therewith power driven rotating blades located in the upper chamber of the pan adapted to act upon the upper portion of the liquid contained therein and force it downward toward the rotating propeller located in the central passage through the steam belt.

ALFRED L. WEBRE.